Patented Apr. 27, 1954

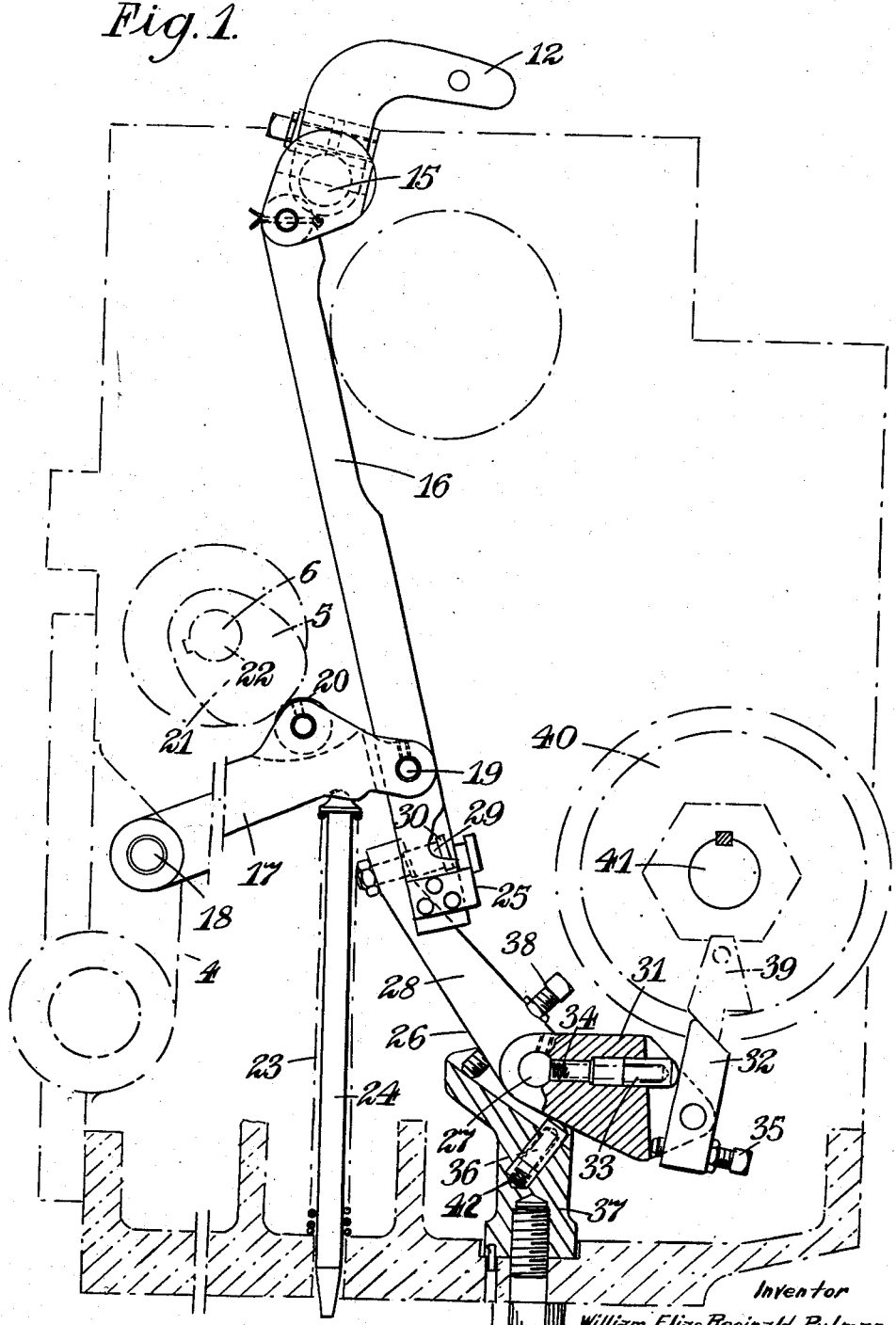

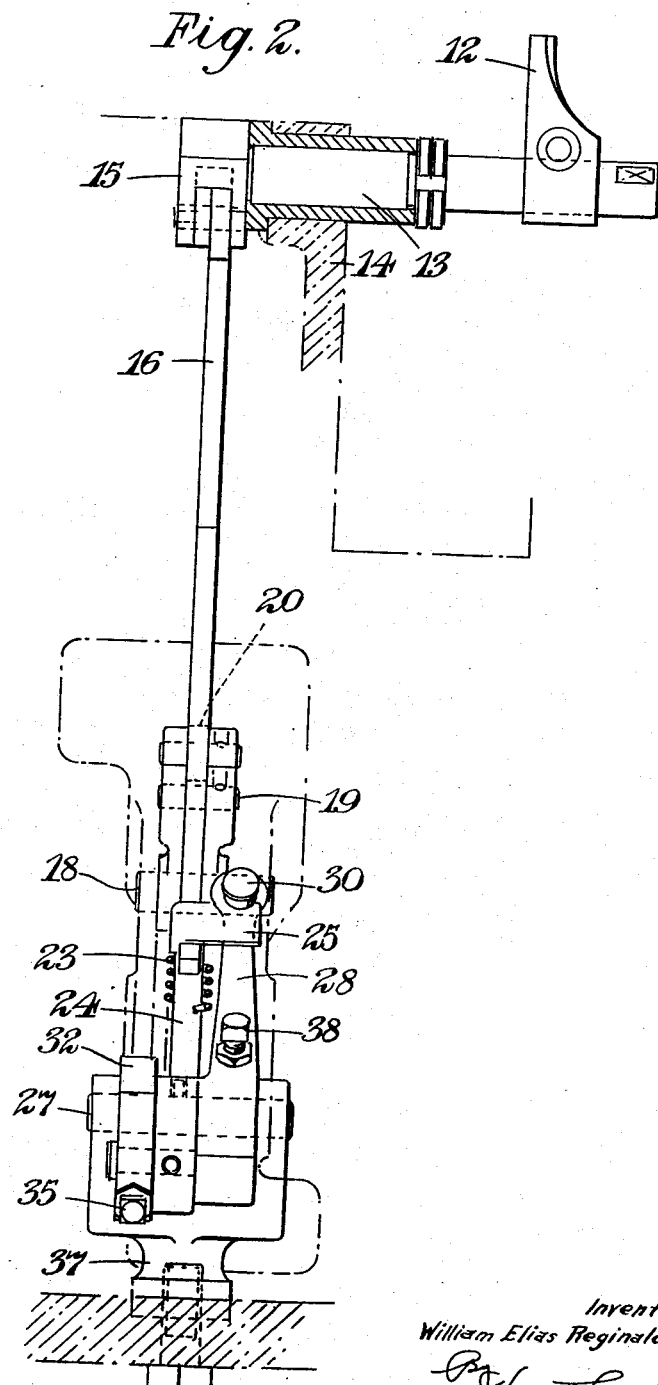

2,676,385

UNITED STATES PATENT OFFICE 2,676,385

WORK-LOCATING STOP MECHANISM FOR AUTOMATIC LATHES

William Elias Reginald Pulman, Hove, England, assignor to C. V. A. Jigs, Moulds & Tools Limited, Hove, England, a British company Application July 18, 1951, Serial No. 237,391

Claims priority, application Great Britain July 27, 1950

6 Claims. (Cl. 29—27)

This invention relates to work locating stop mechanism for use in automatic lathes, in which for example, the following sequence of operations take place: the work is fed longitudinally through a chuck or collet against a movable stop, whereafter the collet or chuck is tightened on the work, the stop moves clear of the work, machining takes place on the projecting portion of the work which is then cut off, the stop reintroduced, the chuck or collet opened and a fresh length of work fed against the stop and so on. Normally therefore, the stop requires to be moved into the path of feed of the work each time the work is fed, and the work is cut off after each feed and machining operation. On occasions however, it may be required to make two or more successive feeds of the work and two or more machining operations on the work before it is cut off, in which case, if the stop is re-introduced after its first withdrawal, it will foul the work. This difficulty has heretofore been overcome in turret lathes by rendering inoperative the main stop (which is usually mounted on or close to the head stock) and by providing different stations on the turret with different stops. This, however, has the disadvantage that it reduces the number of stations on the turret which can be used for tooling operations. One object of the invention is to overcome this drawback.

According to this invention, work locating stop mechanism for automatic lathes having a work feeding mechanism comprises a work stop movable into and out of an operative position in the path of the feed of the work, and adjustable actuating means for the stop operated in timed relationship with the work feeding mechanism whereby a stop may be moved once for each feed of the work or for alternate feeds of the work or after any predetermined number of feeds of the work, according to the adjustment of said adjustable means.

The adjustable actuating means may comprise stopping means continuously urging the work stop towards said operative position, control means operated in timed relationship with the work feeding mechanism and alternately permitting and opposing movement of the work stop by the stopping means, whereby the work stop is consecutively moved into and out of its operative position respectively before and after a feed movement, restraining means operable to hold said work stop out of its operative position and adjustable operating means for said restraining means operable in timed relationship with the work feeding mechanism to operate the restraining means as aforesaid when the control means leave the work stop free to move into said operative position before at least the feed movement immediately subsequent to the first said movement.

The adjustable operating means may be so adjusted as to operate the restraining means before all but the first of a pre-determined number of feed movements. For example, the adjustable operating means may be so adjusted as to operate the restraining means before alternate feed movements.

The following is a more detailed description of the invention as applied to an automatic lathe of the kind having a back shaft which determines the timing of certain operations which are required to be carried out automatically, and a front cam shaft which imparts the required movements to such parts as the turret and the cutting tool which severs the finished part, reference being made to the accompanying drawing in which:

Figure 1 shows the mechanism, partly in section, viewed in the direction of feed of the work, and Figure 2 is a side view of the mechanism shown in Figure 1.

In such a lathe, a swing stop lever 12 is secured near one end to a shaft 13 pivotally mounted in the head stock 14 so that one end of the swing stop lever 12 may be brought opposite the end of the work. The other end of the shaft 13 has a radial arm 15 secured to one end of a link 16. A control lever 17 is pivotally mounted at one end by a pivot pin 18 on a fixed part of the machine and is pivotally connected by a pivot pin 19 at the other end to the link 16 a short distance away from that end of the link which is remote from the swing stop lever 12. The control lever 17 is provided with a roller 20 which is arranged to be engaged by a cam 21 on the work feed cam shaft 22 which extends transversely to and above the control lever 17. The work feed cam-shaft 22 which is driven from the back shaft through a one-revolution-stop clutch actuates the work-feeding mechanism and makes one revolution for each feed of the work. The roller 20 is pressed towards the cam 21 by a compression spring 23 arranged between the control lever 17 and a fixed part of the mechanism and around a guide pin 24. The shaft 22 carrying the cam 21 is intermittently driven at a predetermined speed with respect to the back shaft (not shown). The arrangement is such that the swing stop lever 12 is moved into an operative position by the compression spring 23 and is withdrawn by the cam 21. The link 16 extends downwardly beyond the control lever 17 and has secured near its extremity a laterally extending lug 25 which is substantially parallel with the axes of pivoting of the pins 18 and 19 and shaft 13. A bell crank lever 26 is mounted on a pivot pin 27 to pivot about an axis parallel with the other pivot axes and beneath the lower extremity of the link 16, one arm 28 of which bell crank lever 26 during a pivoting movement may overlap the lower extremity of the link 16 to one side thereof. The arm 28 is provided with a headed pin 29 which, when the link 16 is in a position with the swinging stop lever 12 withdrawn, lies behind the aforesaid laterally extending lug 25. The other arm 31 of the bell crank lever 26 has pivotally mounted on it a pawl 32 which is acted upon by a compression spring 34 through a plunger 33 so that the free end of the pawl 32 is urged away from the pivot pin 27 of the bell crank lever 26, the outer limit of movement being determined by an adjustable stop screw 35 mounted on the pawl 32 and engaging a face on the arm 31 of the bell crank lever 26. This arm 31 is also acted upon by a second spring plunger 36 carried by a fixed part 37 of the machine so as to tend to move the bell crank lever 26 in a direction which brings the aforesaid headed pin 29 out of the path of movement of the laterally extending lug 25. The extent of movement of the bell crank lever 26 in that direction being controlled by an adjustable stop screw 38 carried on the arm 28, which engages a face of the fixed part 37. The spring 42 of the spring plunger 36 is weaker than the spring 34, so that a force urging the pawl 32 against the spring plunger 33 will swing the bell crank lever 26 about the pivot pin 27.

The aforesaid pawl 32 is arranged in the path of movement of an abutment member 39 fixed to a disc 40 secured to the front cam shaft 41. The front cam-shaft 41 makes one revolution for each finished component, i. e. a component is cut from the work bar once in each revolution. The abutment member 39 on the disc 40 is so positioned as to move the headed pin 29 into the path of movement of the laterally extending lug 25 on the link 16 at a time when the cam 21 has engaged with the roller 20 and withdrawn the swinging stop lever 12. Thus, when the cam 21 leaves the roller 20 the spring 23 is prevented from urging the link 16 upwardly and from moving the swinging stop lever 12 into the operation position, by reason of the lug 25 coming into contact with the headed pin 29. When an abutment 39 on the disc 40 has clicked across the pawl 32 the aforesaid arm 28 of the bell crank lever 26 is prevented from being withdrawn out of engagement with the lug 25 by reason of the enlarged head 30 overlapping the lug 25. When, however, the cam 21 again fully engages the roller 20 it moves the lug 25 downwardly away from the headed pin 29 which is then drawn out of the path of movement of the lugs 25 by the spring plunger 36.

In the construction shown in the drawings, the work feed cam shaft 22 is twice actuated, making one full revolution each time, for one revolution of the front cam shaft 41. That is to say, a finished component is cut from the work bar after each two feed movements. The abutment member 39 is so situated as to prevent actuation of the swing stop lever 12 on the second feed movement and the second said movement is terminated by a work stop on the turret of the lathe. It will be understood, however, that any convenient number of feed movements may be made before a component is cut off if the following relationships are observed:

The number of feed movements before a finished component is cut off $=n$

The number of revolutions of the work feed cam shaft 22 for each component $=n$

The number of revolutions of the front cam shaft 41 for each component $=1$

The number of abutment member $39=n-1$, the abutment members 39 being spaced round the disc 40 at angular intervals corresponding to the positions where the bar feed cam-shaft 22 is actuated, with the exception of the one position when it is desired to bring lever 12 into the stop position opposite the work.

Alternatively, a single abutment member 39 may extend around the disc 40, leaving a suitably positioned angular space.

Should an abutment member 39 be disposed so that the bell crank lever 26 is moved before the link 16 has reached its lowermost position, and when the lug 25 happens to be opposite the head 30 of the pin 29, although the head 30 may come into contact with the lug 25, further movement of the abutment member 39 will not cause further movement of the bell crank lever 26 since the pawl 32 will pivot on the bell crank lever 26 against the action of the spring plunger 33. The lug 25 will eventually be moved beyond the head 30 of the pin 29 which will then click forward into position above the lug.

A number of differently positioned work stops may be provided having associated therewith adjustable operating means driven in timed relationship with the front camshaft, whereby during one cycle of the machine the stops are operated successively one after each work feed of the cycle.

One or more work stops operated according to this invention may be arranged to operate before one or more feeds of the work and other stops may be provided on the turret of the lathe for use in other work feeds of the same cycle when the first said work stop or stops is or are inoperative.

I claim:

1. Work-locating stop mechanism for automatic lathes having a work feeding mechanism, which work-locating stop mechanism comprises a work stop movable into and out of an operative position in the path of feed of the work, stopping means continuously urging the work stop towards said operative position, control means operated in timed relationship with the aforesaid work feeding mechanism and alternately permitting and opposing movement of the work stop by the stopping means before and after each feed movement, whereby the work stop is consecutively moved into and out of its operative position respectively before and after a feed movement, restraining means operable to hold the work stop out of its operative position, and operating means for said restraining means operated in timed relationship with the work feeding mechanism, which operating means comprises a predetermined number of operating units, each of which operate said restraining means when the work stop would otherwise be moved into its operative position, and the number of operating units being adjustable according to the number of feeds of the work for which the stop is required to remain out of its operative position.

2. Work-locating stop mechanism as claimed in claim 1 in which the stopping means comprise a pivoted lever arm connected with the work stop and a compression spring engaging the lever arm at a point distant from its pivot axis and said control means comprise a rotatable cam engageable with said lever arm at a point distant from its pivot axis and on the opposite side of the lever arm to the compression spring.

3. Work-locating stop mechanism for automatic lathes having a work feeding mechanism, which work-locating stop mechanism comprises a work stop movable into and out of an operative position in the path of feed of the work, stopping means continuously urging the work stop towards said operative position, control means operated in timed relationship with the aforesaid work feeding mechanism and alternately permitting and opposing movement of the work stop by the stopping means before and after each feed movement, whereby the work stop is consecutively moved into and out of its operative position respectively before and after a feed movement, a catch member connected with the work stop and movable therewith, a pivoted detent arm, a detent member on the detent arm movable therewith into the path of movement of the aforesaid catch member, a spring acting on the detent arm and urging the detent member to move transversely of the path of movement of the catch member, a cam follower on the detent arm distant from the pivot axis thereof, a rotatable operating member driven in timed relationship with the work feeding mechanism, and at least one cam member on the rotatable operating member engageable with said cam follower, co-action of said cam member and cam follower moving the detent member into the path of movement of said catch member when the stop member has been moved to its inoperative position, moving therewith the catch member, thereby arresting said catch member and work stop when the latter is moved towards its operative position, owing to engagement of the catch member by the detent member.

4. Work-locating stop mechanism as claimed in claim 3 in which the spring acting on the detent arm urges the detent member out of the path of movement of the catch member and engagement of the cam member with the cam follower moves the detent member into the path of movement of the catch member, whereby disengagement of the catch member and detent member owing to the aforesaid control means opposing movement of the work stop permits movement of the detent member by said spring out of the path of movement of the catch member.

5. Work-locating stop mechanism as claimed in claim 3 in which the cam follower comprises a pivoted ratchet member, a compression spring being provided urging the ratchet member away from the detent arm, the last said spring being of such a strength and disposed at such a distance from the pivot axis of the ratchet member that engagement of the cam member with the ratchet member normally causes bodily pivoting of the detent arm about its pivot axis while engagement of the cam member with the ratchet member if the path of movement of the detent member is obstructed causes pivoting of the ratchet member about its pivot axis on the detent arm.

6. Work-locating stop mechanism for automatic lathes having a work feeding mechanism, which work-locating stop mechanism comprises a work stop movable into and out of an operative position in the path of feed of the work, a pivot pin carrying the work stop, an operating arm secured to and extending radially from the pivot pin, a pivoted lever arm, a connecting link pivotally connecting said operating arm and the lever arm, a compression spring engaging the lever arm at a point distant from its pivot axis and urging said work stop towards its operative position, a rotatable cam engageable with said lever arm at a point distant from its pivot axis and on the opposite side of the lever arm to the compression spring, which rotatable cam is driven in timed relationship with the work feeding mechanism thereby alternately permitting and opposing movement of the work stop into its operative position by the compression spring before and after each feed movement, a catch member on the end of the aforesaid connecting link distant from said operating arm, a pivoted detent arm, a detent member on the detent arm movable therewith into the path of movement of the aforesaid catch member, a spring acting on the detent arm and urging the detent member to move transversely of the path of movement of the catch member, a cam follower on the detent arm distant from the pivot axis thereof, a rotatable operating member driven in timed relationship with the work feeding mechanism, and at least one cam member on the rotatable operating member engageable with said cam follower, co-action of said cam member and cam follower moving the detent member into the path of movement of said catch member when the stop member has been moved to its inoperative position, moving therewith the catch member, thereby arresting said catch member and work stop when the latter is moved towards its operative position, owing to engagement of the catch member by the detent member.

References Cited in the file of this patent

UNITED STATES PATENTS

| Number | Name | Date |
| --- | --- | --- |
| 1,877,693 | Rich | Sept. 13, 1932 |
| 1,910,574 | Tessky | May 23, 1933 |
| 2,245,732 | Stull | June 17, 1941 |

FOREIGN PATENTS

| Number | Country | Date |
| --- | --- | --- |
| 634,654 | Great Britain | Mar. 22, 1950 |